Sept. 28, 1937.  L. DE FLOREZ  2,094,001
BINAURAL FLYING
Filed June 21, 1935  2 Sheets-Sheet 2
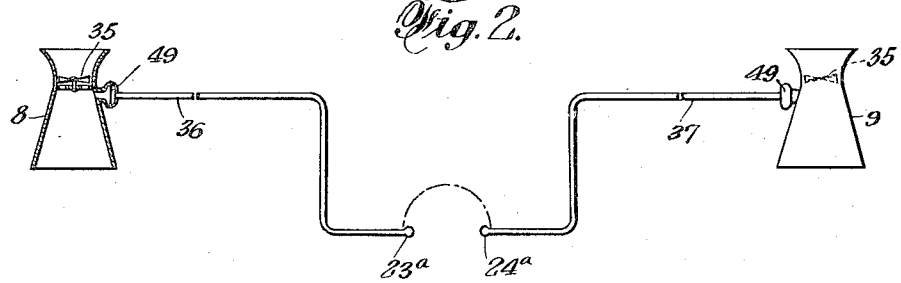
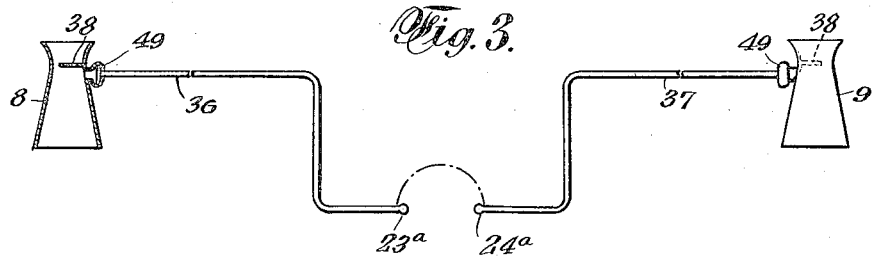
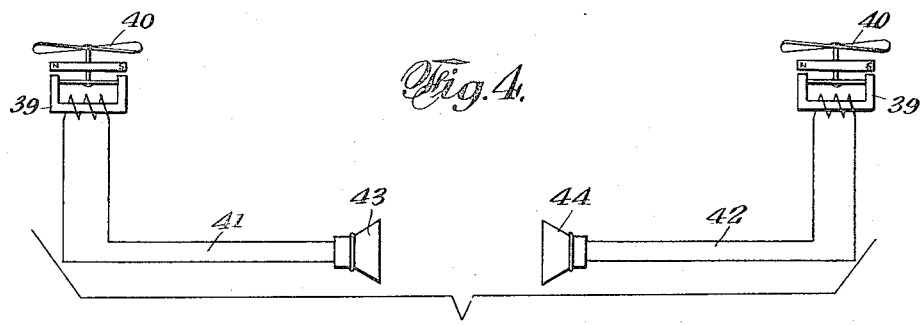
INVENTOR
Luis de Florez
BY
ATTORNEY Patented Sept. 28, 1937

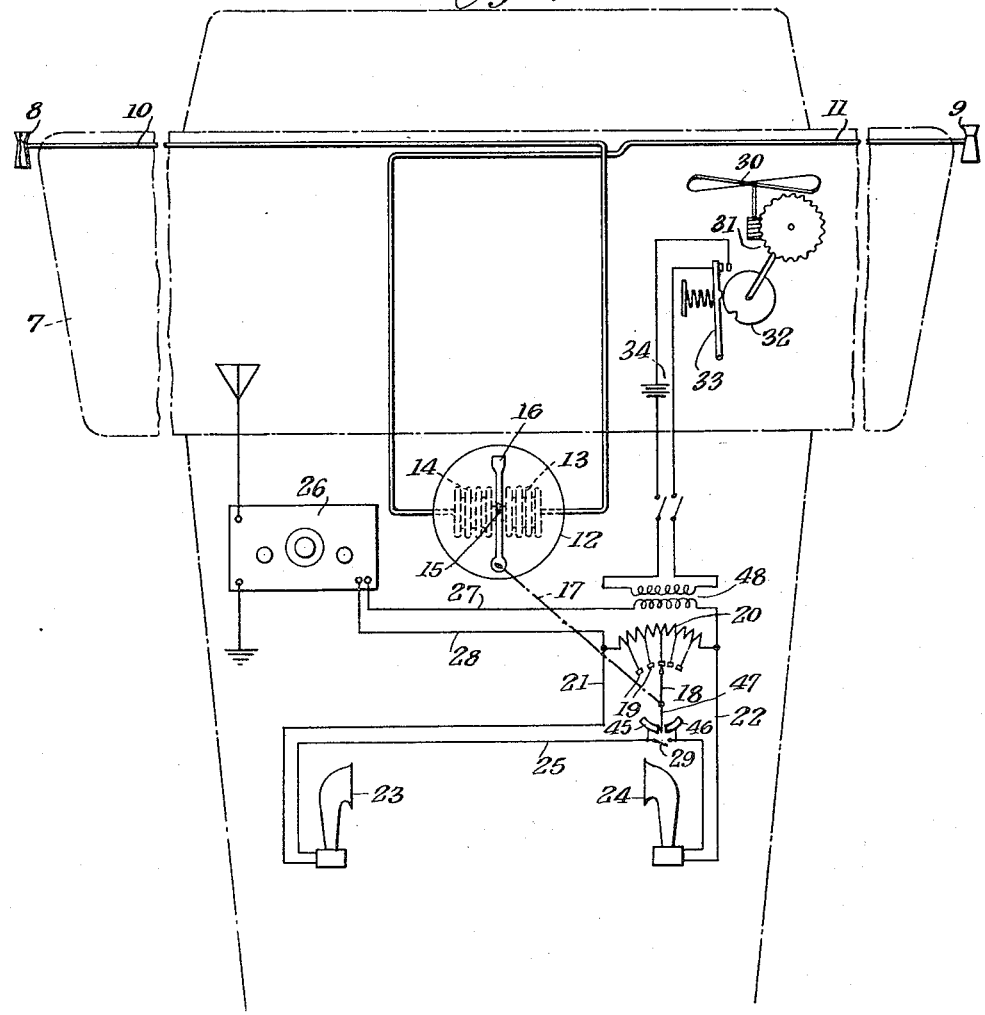

2,094,001

UNITED STATES PATENT OFFICE 2,094,001

BINAURAL FLYING

Luis de Florez, New York, N. Y., assignor to National Aviation Research Corporation, New York, N. Y., a corporation of Delaware Application June 21, 1935, Serial No. 27,653

16 Claims. (Cl. 177—311)

This invention relates to utilization of the binaural faculty for sensing direction and maintaining safe flight of aircraft.

As disclosed in earlier filed patent applications Serial #733,759, filed July 5, 1934, Patent #2,051,-827 of August 25, 1936, and Serial #10,195, filed March 7, 1935, co-pending herewith, with proper equipment the effect of a reference point of sound may be created to enable an aircraft pilot to maintain a safe flying altitude or a desired course of flight.

The objects of the present invention are to provide simple, practical and efficient apparatus of such general nature, capable of being readily applied to existing aircraft at relatively low cost and which will be automatic in its action, accurate and reliable.

Other and further objects, as well as the novel features of construction, combinations and relations of parts by which the purposes of the invention are accomplished, will appear in the course of the following specification.

The drawings accompanying and forming part of the specification illustrate certain of the embodiments of the invention, but it will be appreciated that actual structure may be modified and changed all within the true spirit and broad scope of the invention.

Fig. 1 is a broken and somewhat diagrammatic showing of one embodiment, wherein turn in one direction or the other is indicated in binaural receivers through air speed or pressure sensitive instruments at the wing tips.

Fig. 2 is a broken and partly sectional view of a simpler form of the invention, in which the pressure operated devices in the wing tips are themselves the variable sound producers.

Fig. 3 is a similar view of a modification of the latter involving another and simpler construction of sound generator.

Fig. 4 is a diagrammatic illustration of an embodiment involving magneto electric type of wing tip signal generators.

In Fig. 1, an aircraft wing is indicated at 7. At the tips of this wing or at other suitably separated points are located the air operated or pressure actuated devices consisting in this particular view of Venturi tubes 8 and 9. These devices are shown connected by tubing 10, 11, with the opposite sides of a differential pressure instrument 12. The latter is indicated as embodying opposed sylphon bellows 13, 14, connected respectively with the tubing 10, 11, and having an intermediate connection at 15, with a lever 16, on shaft 17. This so-called lever is shown in the illustration as actually forming a gage finger, making the instrument 12, in fact, a differential pressure operated turn indicator.

The shaft 17 of the differential gage instrument 12 is shown as connected with a switch arm 18, operating over contacts 19, of the sectional resistance 20, connected at opposite ends with the leads 21, 22, of the binaural receivers 23, 24. The latter are indicated as speakers, such as may be located at opposite sides of the pilot's cabin of the plane and they are shown as having a common intermediate connection 25, with left and right contact segments 45, 46, engageable by extension 47 of movable switch arm 18.

The source of signal energy for the binaural receivers is shown in this particular illustration as a radio receiving set 26, having output leads 27, 28, connected with opposite ends of the potentiometer resistance 20.

With straight flight ahead and suction equally applied to opposite sides of the differential gage, the gage reading will be zero and the output of the radio receiver will be applied equally to the binaural receivers, indicating to the pilot the straight flight condition. The suction of the Venturi heads may be corrected, if necessary, as by an adjustable spring in the differential gage, so that with the ship flying straight, this condition will be actually indicated at the binaural receivers.

In a turn, the suction head on the outer wing tip, because of the greater air speed at the outside of the turn, will exert greater suction and produce a corresponding deflection of the differential gage and connections to the binaural receivers.

It will be noted in the illustration, that the suction pipes 10, 11, are crossed or reversely connected with the differential gage, so that with a left hand turn the suction head 9 on the outside, faster, right hand wing tip will exert the greater pull, deflecting the gage finger 16, to the left and through connection 17, turning the switch arm 18, leftward to increase potential on the right hand speaker 24, while reducing the potential on the left hand speaker 23. This increase of sound in the right hand speaker, with reduction of sound in the left hand speaker creates the effect in the pilot's ears of turning to the left away from the reference point of sound. The natural reaction then is to bring the ship back to the right toward the sound reference, when, as sound is heard equally in both ears it will be known that the ship is back on the straight flying course.

With turn to the right, the reverse conditions will exist, that is, the greater suction applied at the faster moving left hand wing tip, will cause deflection of the gage arm and connected switch arm, to the right, increasing the sound in the left hand speaker and producing the aural effect of a turning to the right away from a sound reference point.

Instead of the suction heads 8, 9, pressure heads may be employed connected to directly operate the differential gage. With pressure heads however, the centrifugal force in the turns acts against the pressure heads tending to throw out the column of air of the outer wing tip, thus to some extent neutralizing the pressure at the outer pressure head. With suction heads, these conditions are reversed and the suction actually increased by centrifugal action, the operation to such extent being actually exaggerated and the indications of turn accordingly made the more sensitive.

To provide a quiet straight lane or neutral zone for the pilot, a switch is indicated at 29, by which the intermediate central section of the potentiometer resistance may be cut out of circuit to keep both speakers silent, so long as straight flight is maintained. This switch is shown interposed in the common connection 25, between the two speakers and between the two back contacts 45, 46, for the switch arm 18. In straight flight, the switch arm extension 47 will stand between the contacts 45, 46, and with switch 29 open, both speakers will then be disconnected from the radio receiver. With sufficient turn to bring extension 47 into engagement with contact 45 or 46, the left or right speaker will be cut into service and with switch 29 closed, both speakers will be in service under all conditions.

To provide a pitch or angle of climb indication, there is shown in Fig. 1, an air driven circuit interrupter for superimposing on the speaker signals a series of clicking sounds, the speed of which will be an index of the longitudinal attitude of the ship. This interrupter is indicated as a small propeller 30, driving through worm gear 31, an interrupter disc 32 engaged by a movable switch lever 33, in a battery circuit 34, bridged across the two speaker lines 21, 22, through a transformer coupling 48. By the reduction gearing, the clicks are made slow enough for the pilot to readily sense differences in speed, such as would result from diving or climbing angles. Hence in addition to turn, the pilot is informed binaurally of the longitudinal attitude and with necessary familiarity with the apparatus will know by hearing whether the ship is flying level or is climbing or diving.

In a simpler form of the apparatus as illustrated in Fig. 2, the pressure actuated devices at the wing tips are variable sound generators in the nature of "sirens" 35, located in the Venturi tubes 8, 9. The tubes 36, 37, connecting the sound devices with the binaural speakers are then simply sound conducting conduits. The binaural receivers are shown in this particular instance as separate stethoscope ear pieces 23a, 24a, at the ends of the sound tubes and these tubes are shown as having sound diaphragms 49, therein, closing the tubes against air flow which would be objectionable in such receivers.

The construction shown in Fig. 3 is generally similar to that of Fig. 2, except that the sound is created simply by walls 38, partially closing the throats of the venturis to generate whistling sounds varying in frequency with air speed.

In Fig. 4, the pressure actuated signal devices in the wingtips are small magneto electric generators 39, having propellers 40, and connected electrically at 41, 42, with the binaural receivers such as head 'phones or speakers 43, 44.

In the three forms of the invention illustrated in Figs. 2, 3 and 4, the frequency and hence the pitch of the sound varies with air speed and so may be utilized as an index of longitudinal attitude, the pitch in both receivers increasing with diving and decreasing with climb. Thus in these three simplest forms of the invention, the pilot may tell the longitudinal attitude of the craft by listening for the pitch sound with the volume equal in both ears and even in a turn, the pilot may know with increase or decrease in pitch that the craft is in a descending or an ascending angle.

All forms of the invention are relatively inexpensive, free from complication and well adapted for installation in present forms of aircraft.

What is claimed is:

1. In combination with aircraft, a binaural flight directing sound system, including wind driven variable pitch sound generating devices in spaced relation on said aircraft, binaural sound receivers and sound transmitting connections from one of said variable pitch sound generating devices to one of said receivers and from the other of said variable pitch sound generating devices to the other of said binaural sound receivers.

2. In combination with aircraft, venturis in spaced relation thereon and subjected to airspeed conditions at different portions of said aircraft, a differential pressure instrument connected with and operated from said venturis, a signal source, binaural signal receivers and means operated by said differential pressure instrument for selectively conducting signal energy from said source to the individual binaural receivers in accordance with changes in direction of flight.

3. In combination with aircraft, venturis in spaced relation thereon and subjected to airspeed conditions at different portions of said aircraft, a differential pressure instrument connected with and operated from said venturis, a signal source, binaural signal receivers and means operated by said differential pressure instrument for selectively conducting signal energy from said source to the individual binaural receivers in accordance with changes in direction of flight, and means governed by relative speed of the aircraft with the air for superimposing airspeed signal on the signals transmitted to said binaural receivers.

4. In combination with aircraft, wind driven signal generators having a frequency which is variable with the relative speed of the aircraft and air and mounted in spaced relation thereon, binaural signal receivers and signal transmitting connections from said separate signal generators to the individual binaural signal receivers.

5. In combination with aircraft, air flow pressure collecting devices in spaced relation thereon, sound generating means in said pressure collecting devices, binaural signal receivers, sound conduits extending from one of said sound generating means to one of said binaural receivers and from the other sound generating means to the other binaural receiver and diaphragms in said conduits for preventing air flow therethrough.

6. In combination with aircraft, air flow devices on said craft in the air stream created by relative motion of the craft in the air and positioned in spaced relation to be subjected to the varying air speeds at such spaced positions on the craft, binaural signalling devices and means for effecting actuation of one of said binaural signal devices in accordance with existing air speed conditions at one of said air flow devices and the other of said binaural signal devices in accordance with existing air speed conditions at the other of said air flow devices.

7. In combination with aircraft, binaural signalling devices thereon, turn sensitive means on said aircraft and means operable thereby for individually actuating said signalling devices in accordance with changes of turn from a predetermined flight direction, including a movable switch arm controlled by said turn sensitive means and intermediate and side contacts engageable by said switch arm and connected with the binaural signalling devices and switch means for cutting said intermediate contact out of service to thereby establish a quiet signal condition when the movable switch arm is in cooperative relation with the intermediate switch contact.

8. In combination with aircraft, air flow devices on said craft in the air stream created by relative motion of the craft in the air and positioned in spaced relation to be subjected to the varying air speeds at such spaced positions on the craft, binaural signalling devices and means for effecting actuation of one of said binaural signal devices in accordance with existing air speed conditions at one of said air flow devices and the other of said binaural signal devices in accordance with existing air speed conditions at the other of said air flow devices and said means including apparatus variably operable according to relative airspeed of the craft for imposing airspeed indications on the signals at said signalling devices.

9. In combination with aircraft, binaural signalling devices, means for actuating said binaural signalling devices substantially equally during straight flight of said craft and for actuating said receivers differentially in accord with turn movements of said aircraft and independent control mechanism for rendering said means inoperative during straight flight of said aircraft to provide a quiet signal condition during straight flight of the craft.

10. In combination with aircraft, a binaural flying system, comprising in combination, binaural signal receivers on said aircraft, a signal source for said receivers, differential pressure operated mechanism and means actuated thereby for variably switching signal energy from said source to the individual binaural receivers, air flow devices in spaced relation on said aircraft and subjected to air speed conditions at different portions of said aircraft and connections from said air flow devices to said differential pressure operated mechanism for effecting operation of the latter in accordance with air speed conditions at the spaced air flow devices and said variable switching means including mechanism for increasing signal energy in one binaural receiver while decreasing signal energy in the other receiver.

11. In combination with aircraft, binaural signal receivers thereon, a signal source for said receivers, a differential pressure gage instrument, means operated by said instrument for selectively conducting signal energy from said source to the individual binaural receivers, air flow devices directed to be affected by relative motion of the aircraft with the air and mounted in spaced relation on said aircraft to be thereby subjected to airspeed conditions at different portions of said aircraft and operating connections from said air flow devices to opposite sides of said differential pressure gage instrument.

12. In apparatus as disclosed, the combination with aircraft, of binaural signal receivers thereon, a signal source for said receivers, turn sensitive means on said aircraft, a travelling switch arm operable from said turn sensitive means, contacts engageable thereby, electrical resistance connected with said contacts, electrical connections from said signal source to said binaural receivers by way of said resistance, contacts and switch arm to provide substantially equal signal to the two receivers in an intermediate position of the switch arm and to increase resistance to one while decreasing resistance to the other of the receivers with deviation of the switch arm from said intermediate position, and switch means for controlling said electrical connections to quiet the binaural receivers in an intermediate position of the travelling switch arm.

13. In apparatus as disclosed, the combination with aircraft, of binaural signal receivers thereon, a signal source for said receivers, turn sensitive means on said aircraft, electrical connections from said signal source to said binaural receivers, including a potentiometer bridged across the receivers and having switch contacts, a movable switch arm controlled by said turn sensitive means and cooperable with said potentiometer contacts and means for rendering a section of said potentiometer inoperative in a predetermined position of said switch arm.

14. Binaural flying apparatus, comprising in combination with aircraft, binaural signal receivers, a radio receiver signal source for said binaural receivers, means sensitive to change from flight attitude for variably impressing the signal from said radio receiver on said binaural receivers in accordance with deviation from flight attitude and means controlled by air speed of the craft for superimposing on said first signals an additional speed indicating signal varying in frequency with the relative air speed of the craft.

15. Binaural flying apparatus, comprising in combination with aircraft, binaural signal receivers, a radio receiver signal source for said binaural receivers, means sensitive to change from flight attitude for variably impressing the signal from said radio receiver on said binaural receivers in accordance with deviation from flight attitude, means controlled by air speed of the craft for varying the signal at the binaural receivers in accordance with air speed of the craft and means for rendering said air speed controlled means inoperative.

16. In combination with aircraft, binaural signalling devices, means for actuating said binaural signalling devices substantially equally during predetermined normal flight attitude of said craft and for actuating said receivers differentially in accordance with deviation from said predetermined normal flight attitude and independent control mechanism for rendering said means inoperative during normal fight attitude of said craft to thereby provide a quiet signal condition during maintenance of said normal flight attitude of the craft.

LUIS DE FLOREZ.